United States Patent [19]
De Hair et al.

[11] Patent Number: 5,677,598
[45] Date of Patent: Oct. 14, 1997

[54] LOW-PRESSURE MERCURY DISCHARGE LAMP WITH COLOR TEMPERATURE ADJUSTMENT

[75] Inventors: Johannes T. W. De Hair; Lukas Kastelein, both of Roosendaal, Netherlands

[73] Assignee: U.S. Philips Corporation, New York, N.Y.

[21] Appl. No.: 358,442

[22] Filed: Dec. 19, 1994

[30] Foreign Application Priority Data

Dec. 17, 1993 [BE] Belgium ................ 09301410

[51] Int. Cl.$^6$ .................................... H05B 41/16
[52] U.S. Cl. .................. 315/147; 315/324; 315/317; 315/294; 315/334; 315/107; 313/487; 313/493
[58] Field of Search ................ 313/25, 28, 39, 313/11, 620, 617, 571, 487, 493; 315/107, 112, 116, 145, 147, 317, 334, 324, 294, 244

[56] References Cited

U.S. PATENT DOCUMENTS

| | | | |
|---|---|---|---|
| 976,002 | 11/1910 | Schonherr | 315/147 |
| 1,984,449 | 4/1934 | Zecher | 315/147 |
| 2,265,323 | 3/1941 | Spanner | 315/147 |
| 2,301,671 | 11/1942 | Abadie | 315/147 |
| 2,561,868 | 7/1951 | Jenkins et al. | 313/610 |
| 4,045,664 | 8/1977 | Vrenken et al. | 315/294 X |
| 4,367,434 | 1/1983 | Miller | 315/51 |
| 4,625,152 | 11/1986 | Nakai | 315/317 |
| 4,990,821 | 2/1991 | Blaisdell et al. | 313/112 |
| 5,003,220 | 3/1991 | Fohl et al. | 313/488 |
| 5,202,607 | 4/1993 | Broyer et al. | 315/58 |

FOREIGN PATENT DOCUMENTS

| | | | |
|---|---|---|---|
| 2089190 | 11/1993 | Canada | H05B 41/40 |
| 54-129771 | 10/1979 | Japan | H01J 61/92 |
| 0129771 | 10/1979 | Japan | 315/147 |
| 3222290 | 10/1991 | Japan | H05B 41/36 |

*Primary Examiner*—Robert Pascal
*Assistant Examiner*—Arnold Kinkead
*Attorney, Agent, or Firm*—Walter M. Egbert

[57] ABSTRACT

A low-pressure mercury discharge lamp with a lamp vessel having a first lamp vessel portion (La1) with a first electrode (E11) and a first luminescent layer which radiates white light of a first color temperature during lamp operation and a second lamp vessel portion (La2) with a second electrode (E12) and with a second luminescent layer which radiates white light of a second colour temperature different from the first during lamp operation. The first lamp vessel portion and the second lamp vessel portion are interconnected by a connection which allows a filling of mercury and a rare gas in both portions to pass and together enclose a discharge space. The discharge space contains only one further electrode (E13) for both the first and second lamp vessel portions. Circuit I generates a first current through the first lamp vessel portion and a second current through the second lamp vessel portion and circuit II adjusts the ratio between the effective value of the first current and the effective value of the second current. The first current and the second current are high-frequency currents of changing polarity. The color temperature of the light radiated by the lamp can be adjusted over a comparatively wide range, while the lamp is of a simple construction and has a comparatively high luminous efficacy.

22 Claims, 1 Drawing Sheet

5,677,598

LOW-PRESSURE MERCURY DISCHARGE LAMP WITH COLOR TEMPERATURE ADJUSTMENT

BACKGROUND OF THE INVENTION

This invention relates to a low-pressure mercury discharge lamp comprising a first lamp vessel provided with a first electrode, with a filling comprising mercury and rare gas, and with a first luminescent layer which radiates white light of a first colour temperature during lamp operation, a second lamp vessel provided with a second electrode, with a filling comprising mercury and rare gas, and with a second luminescent layer which radiates white light of a second colour temperature different from the first during lamp operation, means I for generating a first current through the first lamp vessel and a second current through the second lamp vessel, and means II for adjusting the ratio between the effective value of the first current and the effective value of the second current.

Such a low-pressure mercury discharge lamp is known from Japanese Patent publication YP-A3-222290. In the known low-pressure mercury discharge lamp, both the first and the second lamp vessel is provided with two electrodes, while both the first and the second current is a direct current. The compositions of the first and second luminescent layers were so chosen that during lamp operation the two lamp vessels radiate white light of which the colour point either coincides with a point of the Planckian locus or is situated close to the Planckian locus. Since the colour points of the light radiated by the first and the second lamp vessel were chosen to be different, it is possible to adjust the colour point of the light radiated jointly by the two lamp vessels over a certain range by using the means II. Each colour point within this range lies on the Planckian locus or in the immediate vicinity thereof. As a result, the colour of the light radiated by the low-pressure mercury discharge lamp is perceived as pleasant by the human eye. A disadvantage of the known low-pressure mercury discharge lamp is, however, that its luminous efficacy is low while in addition the use of a direct current may lead to striations. The construction of the known low-pressure mercury discharge lamp, moreover, is comparatively expensive.

SUMMARY OF THE INVENTION

It is an object of the invention to provide a low-pressure mercury discharge lamp whose colour point is adjustable, whose luminous efficacy is comparatively high, and whose construction is comparatively simple.

According to the invention, this object is achieved in a low-pressure mercury discharge lamp of the kind mentioned in the opening paragraph in that the first and the second lamp vessel are interconnected by means of a connection which allows the filling to pass and together enclose a discharge space, in that the first current and the second current are high-frequency currents of changing polarity, and in that the discharge space contains only one further electrode.

Since the discharge space of a low-pressure mercury discharge lamp according to the invention contains only one further electrode, the construction of the low-pressure mercury discharge lamp is comparatively simple and thus comparatively inexpensive. The first and the second current flow through the further electrode for each adjusted colour temperature during stable lamp operation. This means that the current through the further electrode has a comparatively high value for each adjusted colour temperature. As a result of this, the electrode drop of the further electrode is comparatively low, so that only a comparatively small portion of the power consumed by the low-pressure mercury discharge lamp is dissipated in the space between the positive column and the further electrode. The luminous efficacy of a low-pressure mercury discharge lamp according to the invention is comparatively high as a result, and also because the first and second currents are high-frequency currents.

It should be noted that a low-pressure mercury discharge lamp is disclosed in, for example, U.S. Pat. No. 4,625,152, comprising three interconnected lamp vessels whose walls are coated with a red-luminescing, a blue-luminescing and a green-luminescing layer, respectively. The low-pressure mercury discharge lamp is provided with three anodes and a common cathode. This low-pressure mercury discharge lamp, however, is designed for DC operation, this direct current periodically maintaining a discharge in each of the three lamp vessels in succession. The colour of the light radiated by the low-pressure mercury discharge lamp is adjusted in that the time intervals during which a discharge is maintained in each of the lamp vessels is adjusted. It is highly complicated to generate white light whose colour temperature is adjustable over a certain range by means of such a low-pressure mercury discharge lamp. Since the cathode of this low-pressure mercury discharge lamp is constructed as a common cathode, and the low-pressure mercury discharge lamp is operated with a direct current, a fast generation of the discharge in each of the lamp vessels is achieved in order to render the colour of the light radiated by the low-pressure mercury discharge lamp reproducible.

Preferably, the low-pressure mercury discharge lamp according to the invention is also provided with means III for adjusting the sum of the effective value of the first current and the effective value of the second current. These means III render it possible to adjust the luminous flux of the light jointly radiated by the first and the second lamp vessel. Thus the luminous flux as well as the colour point of the light radiated by the low-pressure mercury discharge lamp can be adjusted.

It is favourable when the means I comprise a first DC-AC converter and a second DC-AC converter, each DC-AC converter comprising two switching elements, an inductive element, and a capacitive element. These DC-AC converters are of the so-called half-bridge type, generating the first and the second current with a comparatively high efficiency. It is also possible to construct the means I in a comparatively simple manner in that the capacitive element of the first DC-AC converter and the capacitive element of the second DC-AC converter comprise at least one common capacitor.

The means II may be constructed in a comparatively simple manner in that the means II comprise means for low-frequency interruption of the first current and the second current. It was found in this case that the operation and the useful life of the low-pressure mercury discharge lamp are positively influenced when the low-pressure mercury discharge lamp is in addition provided with means IV for generating a current through the first electrode when the means II interrupts the first current and for generating a current through the second electrode when the means II interrupts the second current. This measure prevents the first and second electrodes from cooling down strongly during the respective interruptions of the first and second currents.

BRIEF DESCRIPTION OF THE DRAWINGS

Embodiments of the invention will be explained with reference to a drawing, in which.

DESCRIPTION OF THE PREFERRED EMBODIMENTS

Figure 1:
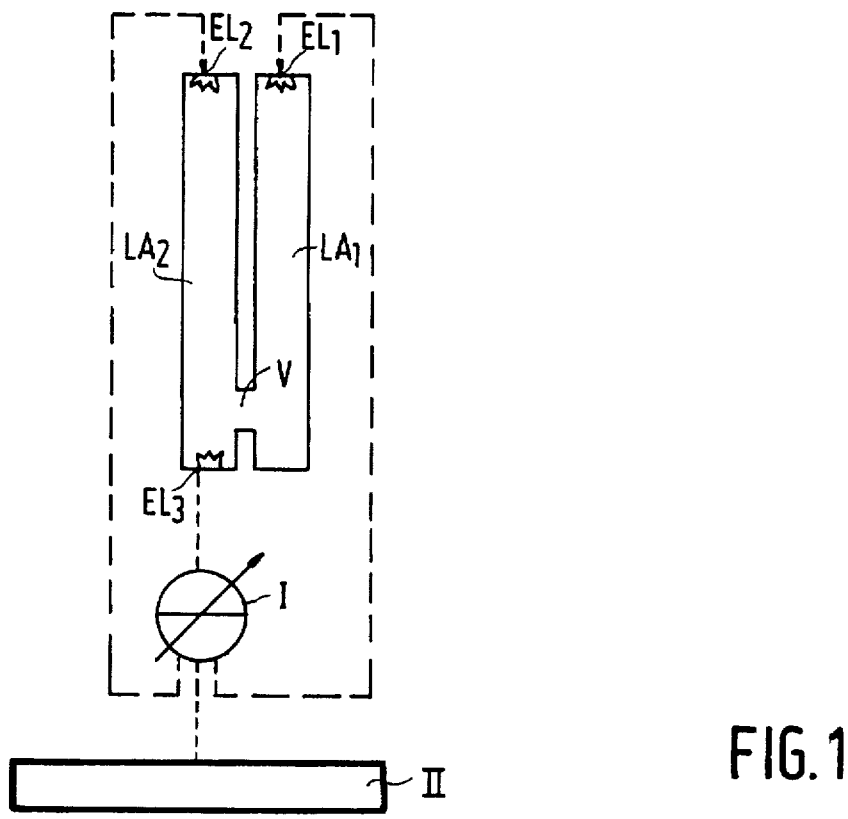
FIG. 1 is a diagrammatic picture of the construction of an embodiment of a low-pressure mercury discharge lamp according to the invention.

In FIG. 1, La1 and La2 designate a first and a second lamp vessel, respectively. The two lamp vessels contain a filling comprising mercury and rare gas and are interconnected through a connection V which allows the filling to pass. The wall of the first lamp vessel La1 is coated with a first luminescent layer of a first composition which radiates white light of a first colour temperature during lamp operation. The wall of the second lamp vessel La2 is coated with a second luminescent layer of a second composition different from the first which radiates white light of a second colour temperature different from the first during lamp operation. The lamp vessels La1 and La2 enclose a discharge space. A first electrode E11, a second electrode E12 and a further electrode E13 are arranged in this discharge space. I are means for generating a first high-frequency current of changing polarity through the first lamp vessel La1 and a second high-frequency current of changing polarity through the second lamp vessel La2. Means I are coupled to the electrodes E11, E12 and E13 for this purpose. II are means for adjusting the ratio between the effective values of the first current and the second current. Means II are coupled to means I for this purpose. These couplings have been indicated with broken lines in FIG. 1.

The operation of the low-pressure mercury discharge lamp shown in FIG. 1 is as follows.

When connection terminals not shown in FIG. 1 and forming a part of means I are connected to a supply voltage source, the low-pressure mercury discharge lamp is ignited by means which are also not shown. During the ensuing stationary operation, a first high-frequency current of changing polarity flows through the first lamp vessel La1 between first electrode E11 and further electrode E13. A second high-frequency current of changing polarity at the same time flows in the second lamp vessel La2 between the second electrode E12 and the further electrode E13. The colour temperature of the light radiated by the low-pressure mercury discharge lamp is determined by the ratio between the effective values of the first current and of the second current. Through adjustment of this ratio by means II, the colour temperature of the light radiated by the low-pressure mercury discharge lamp may be adjusted over a range whose boundaries follow from the compositions of the first and second luminescent layers.

Figure 2:
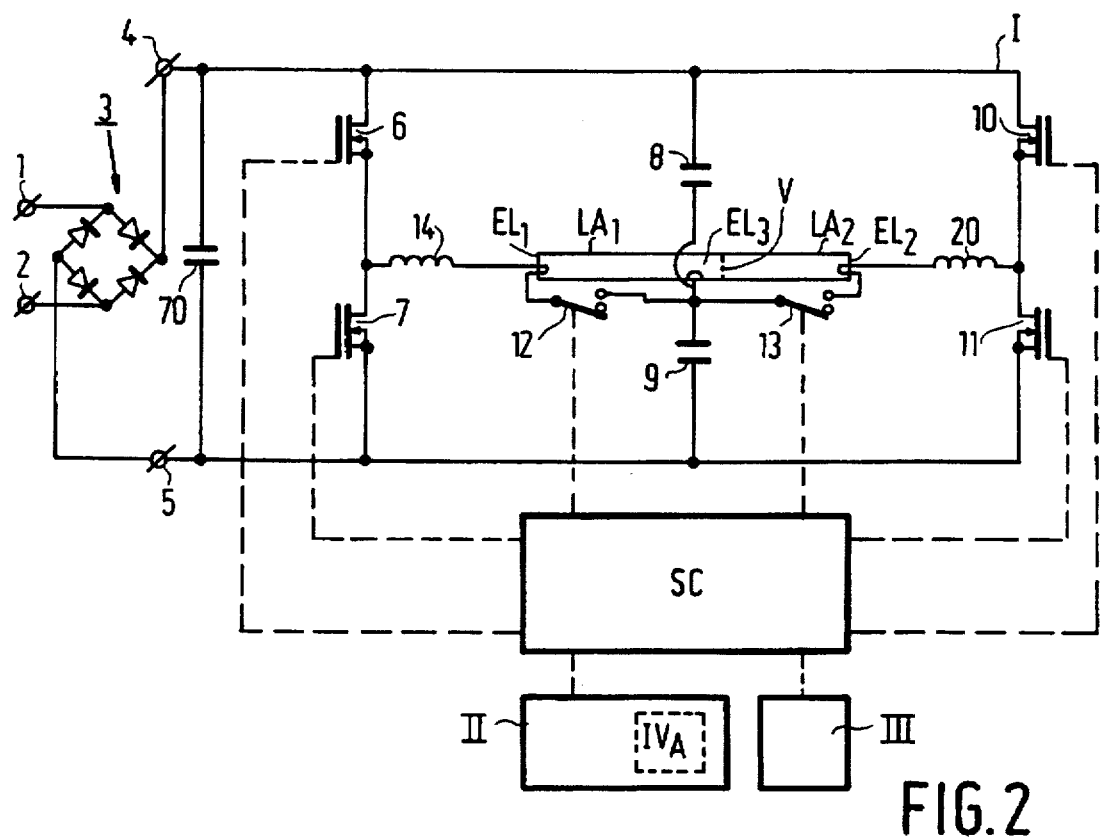
FIG. 2 shows the embodiment of FIG. 1 in more detail.

In FIG. 2, components 1–11, 14 and 20 together with the control circuit SC form means I for generating a first current through the first lamp vessel and a second current through the second lamp vessel. Switching elements 6 and 7, inductive element 14 and capacitors 8 and 9 together with control circuit SC form a first DC-AC converter. Switching elements 10 and 11, inductive element 20 and capacitors 8 and 9 together with control circuit SC form a second DC-AC converter. Capacitors 8 and 9 thus form part of both the first and the second DC-AC converter. Circuit portion IVa forming part of the means II together with control circuit SC and switching elements 12 and 13 forms means for the low-frequency interruption of the first and second currents. Circuit portion IVa together with control circuit SC and switching elements 12 and 13 also serves to form means IV for generating a current through the first electrode E11 when the first current is interrupted and for generating a current through the second electrode E12 when the second current is interrupted. In addition, the low-pressure mercury discharge lamp shown in FIG. 2 comprises means II for adjusting the ratio between the effective values of the first and the second current, and means III for adjusting the sum of the effective values of the first current and the second current.

1 and 2 denote terminals for connection to a supply voltage source which supplies a supply voltage of changing polarity. Terminals 1 and 2 at the same time form input terminals for diode bridge 3. Terminals 4 and 5 form output terminals of diode bridge 3. Terminal 4 is connected to terminal 5 through capacitor 70. Capacitor 70 is shunted by a series circuit of switching elements 6 and 7, by a series circuit of capacitor 8 and capacitor 9, and by a series circuit of switching elements 10 and 11. Control electrodes of the switching elements 6, 7, 10 and 11 are coupled to the control circuit SC for generating a signal so as to render the switching elements 6, 7, 10, 11, 12 and 13 conducting and non-conducting. A common junction point of switching element 6 and switching element 7 is connected to a first side of inductive element 14. A second side of inductive element 14 is connected to a first end of electrode E11. A second end of electrode E11 is connected to electrode E13 and to a first side of capacitor 9 via switching element 12. A control electrode of switching element 12 is coupled to the control circuit SC. A common junction point of switching element 10 and switching element 11 is connected to a first side of inductive element 20. A second side of inductive element 20 is connected to a first end of electrode E12. A second end of electrode E12 is connected to electrode E13 and the first side of capacitor 9 v/a switching element 13. A control electrode of switching element 13 is coupled to the control circuit SC. The control circuit SC is coupled to means II for adjusting the ratio between the effective value of the first current and the effective value of the second current. The control circuit SC is also coupled to means III for adjusting the sum of the effective values of the first current and the second current. The control circuit SC is also coupled to the circuit portion IVa.

The operation of the low-pressure mercury discharge lamp shown in FIG. 2 is as follows.

When terminals 1 and 2 are connected to a supply voltage source, a DC voltage is present across capacitor 70. The control circuit SC renders the switching elements 6, 7, 10 and 11 conducting and non-conducting at a high frequency during stationary lamp operation. At the same time, the means II render the switching element 13 conducting and the switching element 12 non-conducting v/a the control circuit SC during a first time interval of a low-frequency period. As a result of this, a substantially square-wave high-frequency potential is present at the common junction point of switching element 6 and switching element 7, which causes a high-frequency current to flow through the lamp vessel La1 during the first time interval. A substantially square-wave high-frequency potential is also present at the common junction point of switching element 10 and switching element 11, which causes a high-frequency current to flow through electrode E12 and switching element 13. This high-frequency current heats the electrode E12. No current flows in the lamp vessel La2 during the first time interval of the low-frequency period. During a second time interval of the low-frequency period, the control circuit SC renders the switching element 12 conducting and the switching element 13 non-conducting. As a result of this, a high-frequency current flows through the lamp vessel La2 during/his second time interval of the low-frequency period. At the same time, a high-frequency current flows through the electrode E11 and the switching element 12. This latter high-frequency current heats the electrode E11 during the second time interval of the low-frequency period. The colour point of the light radiated by the low-pressure mercury discharge lamp is adjusted through adjustment of the ratio between the first time interval and the second time interval of a low-frequency period by means II. The luminous flux of the low-pressure mercury discharge lamp is at its maximum when the sum of the durations of the first time interval and the second time interval is substantially equal to the duration of a low-frequency period. This luminous flux may be reduced in that the two switching elements 12 and 13 are rendered both conducting during a third time interval of the low-frequency period through means III and control circuit SC. During this third time interval, no current flows through the first lamp vessel La1 and the second lamp vessel La2. Both electrode E11 and electrode E12 are heated, however, since a high-frequency current flows both through electrode E11 and switching element 12 and through electrode E12 and switching element 13 during this third time interval.

It is noted here that it is alternatively possible to cause an uninterrupted high-frequency current to flow both through lamp vessel La1 and through lamp vessel La2, and to adjust the colour point of the light radiated by the low-pressure mercury discharge lamp through adjustment of the ratio between the amplitudes of the first and the second current. This may be realised, for example, in that the ratio between the duty cycle of the switching elements 6 and 7 on the one hand and the duty cycle of the switching elements 10 and 11 on the other hand is adjusted. It is also possible to adjust the luminous flux of the low-pressure mercury discharge lamp by means of these duty cycles. Mother possibility is to choose the frequency with which switching element 6 and switching element 7 are rendered conducting to be different from the frequency with which switching element 10 and switching element 11 are rendered conducting. The colour point of the light radiated by the low-pressure mercury discharge lamp may then be adjusted through the choice of the ratio between these two frequencies. The luminous flux of the low-pressure mercury discharge lamp may also be adjusted by way of these frequencies. In both cases, the switching elements 12 and 13 and the portion of the control circuit SC which renders these switching elements conducting and non-conducting may be omitted.

We claim:

1. A low-pressure mercury discharge lamp comprising:
   a first vessel provided with a first electrode, with a filling comprising mercury and rare gas, and with a first luminescent layer which radiates white light of a first colour temperature during lamp operation,
   a second lamp vessel provided with a second electrode, with a filling comprising mercury and rare gas, and with a second luminescent layer which radiates white light of a second colour temperature different from the first during lamp operation,
   means I for generating a first current through the first lamp vessel and a second current through the second lamp vessel,
   means II for adjusting the ratio between the effective value of the first current and the effective value of the second current,
   characterized in that: the first and the second lamp vessels are interconnected by means of a connection which allows the filling to pass and together enclose a discharge space, the first current and the second current are high-frequency currents of changing polarity, the discharge space contains only one further electrode, and the lamp further comprises means III for adjusting the sum of the effective value of the first current and the effective value of the second current.

2. A low-pressure mercury discharge lamp as claimed in claim 1, wherein the first and second current generating means comprise a first DC-AC converter and a second DC-AC converter, each DC-AC converter comprising two switching elements, an inductive element, and a capacitive element.

3. A low-pressure mercury discharge lamp as claimed in claim 2, wherein the capacitive element of the first DC-AC converter and the capacitive element of the second DC-AC converter comprise at least one common capacitor.

4. A low-pressure mercury discharge lamp as claimed in claim 3, wherein the ratio adjusting means comprise means for low-frequency interruption of the first current and the second current.

5. A low-pressure mercury discharge lamp as claimed in claim 4, further comprising means for generating a current through the first electrode when the ratio adjusting means interrupts the first current and for generating a current through the second electrode when the ratio adjusting means interrupts the second current.

6. A low-pressure mercury discharge lamp as claimed in 2, wherein the ration adjusting means comprise means for low-frequency interruption of the first current and the second current.

7. A low-pressure mercury discharge lamp as claimed in claim 6, further comprising means for generating a current through the first electrode when the ration adjusting means interrupts the first current and for generating a current through the second electrode when the ratio adjusting means interrupts the second current.

8. A low-pressure mercury discharge lamp as claimed in 1, wherein the ratio adjusting means comprise means for low-frequency interruption of the first current and the second current.

9. A low-pressure mercury discharge lamp as claimed in claim 8, further comprising means for generating a current through the first electrode when the ratio adjusting means interrupts the first current and for generating a current through the second electrode when the ratio adjusting means interrupts the second current.

10. A low pressure mercury vapor discharge lamp emitting white light of controllable color temperatures, said lamp comprising:
   a. a discharge vessel sealed in a gas-tight manner and including a filling of mercury and a rare gas, said discharge vessel having a first light-emitting portion with a first luminescent layer which radiates white light at a first color temperature and a second light-emitting portion with a second luminescent layer which radiates white light at a second color temperature different from said first color temperature, said discharge vessel having a first discharge electrode for said first portion, a second discharge electrode for said second portion, and a third electrode common to said first and second discharge electrodes, a gas discharge being maintainable between said first discharge electrode and said common electrode to emit light from said first portion and between said second discharge electrode and said common electrode to emit light from said second portion; and
   b. a ballast circuit connectable to said electrodes for energizing said discharge vessel to emit white light with a color temperature determined by the light output from said first and second portions, said ballast circuit including means for generating a first AC current in said first portion between said first discharge electrode and said common electrode and a second AC current in said second portion between said second discharge electrode and said common electrode, and control means for controlling (i) the ratio of the effective value of the first AC current and the effective value of the second AC current to obtain a blended light with a controlled color temperature and (ii) for adjusting the sum of the effective values of the first and second currents to adjust the total light output of the lamp.

11. A low-pressure mercury discharge lamp as claimed in claim 10, wherein the first and second current generating means comprise a first DC-AC converter and a second DC-AC converter, each DC-AC converter comprising two switching elements, and inductive element, and a capacitive element.

12. A low-pressure mercury discharge lamp as claimed in claim 11, wherein the capacitive element of the first DC-AC converter and the capacitive element of the second DC-AC converter comprise at least one common capacitor.

13. A lamp according to claim 10, wherein said control means maintains the amplitudes of said first and second AC currents each at a substantially constant level by periodically interrupting the first and second AC currents to control the effective amplitude values of the first and second AC currents.

14. A low-pressure mercury discharge lamp as claimed in claim 13, further comprising means for generating a current through the first electrode when the control means interrupts the first current and for generating a current through the second electrode when the control means interrupts the second current.

15. A lamp according to claim 10, wherein said ballast circuit maintains a substantially uninterrupted flow of said first and second AC currents and includes a first pair of switching elements controlling the generation of the first AC current and a second pair of switching elements controlling generation of the second AC current, each of said first and second pairs of switching elements having a respective duty cycle, and said control means controls the effective values of said first and second currents by adjusting the duty cycles of said first and second pairs of switching elements.

16. A lamp according to claim 10, wherein said ballast circuit maintains a substantially uninterrupted flow of said first and second AC currents and includes a first pair of switching elements controlling the generation of the first AC current and a second pair of switching elements controlling generation of the second AC current, each of said first and second pairs of switching elements having a respective switching frequency, and said control means controls the effective values of said first and second-currents by adjusting the switching frequency of said first and second pairs of switching elements.

17. A lamp according to claim 10, wherein said control means controls the light output of said first and second light emitting portions by controlling the frequency of the first and second AC currents.

18. A lamp according to claim 10, wherein said ballast circuit generates first and second square wave signals controlling, respectively, said first and second AC currents, and said control means controls said first and second AC currents by controlling said the duty cycle of said first and second square wave signals.

19. A discharge lamp apparatus which comprises:

a gas-tight discharge vessel containing an ionizable filling and having first and second sections in communication with one another and each with a luminescent layer which radiates white light at respective first and second color temperatures different from one another, first and second heatable electrodes in said first and second sections, respectively, and a third electrode spaced apart from and common to the first and second electrodes, means for simultaneously supplying operating voltages to said first and second electrodes for generating first and second currents of alternating polarity through the first and second sections between said first and second electrodes and said common electrode, respectively wherein said first and second currents are high frequency currents means for controlling the ratio of the effective value of the first AC current and the effective value of the second AC current to obtain a light with a controlled color temperature; and means for periodically interrupting the flow of said first and second current at a low frequency.

20. The discharge lamp apparatus as claimed in claim 19 wherein said periodic current interrupting means includes means for supplying a current flow in said first and second heatable electrodes when said first and second currents, respectively, are interrupted.

21. The discharge lamp apparatus as claimed in claim 19 further comprising means for adjusting the sum of the effective values of the first and second currents to adjust the total light output of the lamp.

22. The lamp according to claim 10 wherein said control means periodically interrupts the first and second AC currents to control the effective amplitude values thereof.

* * * * *